US010478813B2

(12) United States Patent
Wan et al.

(10) Patent No.: US 10,478,813 B2
(45) Date of Patent: Nov. 19, 2019

(54) CATALYTIC MATERIAL FOR CATALYTIC ACTIVATION OF PERSULFATE AND TARGETED DEGRADATION OF TYPICAL POLLUTANT IN PAPERMAKING WASTEWATER AND SYNTHESIS METHOD AND USE THEREOF

(71) Applicant: SOUTH CHINA UNIVERSITY OF TECHNOLOGY, Guangdong (CN)

(72) Inventors: Jinquan Wan, Guangdong (CN); Jiumei Wang, Guangdong (CN); Yongwen Ma, Guangdong (CN); Yan Wang, Guangdong (CN); Zeyu Guan, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/083,519

(22) PCT Filed: Nov. 23, 2017

(86) PCT No.: PCT/CN2017/112448
§ 371 (c)(1),
(2) Date: Sep. 10, 2018

(87) PCT Pub. No.: WO2018/188345
PCT Pub. Date: Oct. 18, 2018

(65) Prior Publication Data
US 2019/0232265 A1    Aug. 1, 2019

(30) Foreign Application Priority Data
Apr. 12, 2017    (CN) .......................... 2017 1 0236647

(51) Int. Cl.
*B01J 31/00* (2006.01)
*B01J 31/16* (2006.01)
(Continued)

(52) U.S. Cl.
CPC .......... *B01J 31/1691* (2013.01); *C02F 1/725* (2013.01); *B01J 2231/70* (2013.01);
(Continued)

(58) Field of Classification Search
None
See application file for complete search history.

(56) References Cited

FOREIGN PATENT DOCUMENTS

| CN | 104588017 | 5/2015 |
|---|---|---|
| CN | 105399197 | 3/2016 |

(Continued)

OTHER PUBLICATIONS

Chalati et al, Optimisation of the synthesis of MOF nanoparticles made of flexible porous iron fumarate MIL-88A, J. Mater. Chem, 21, 2220-2227 (Year: 2011).*
(Continued)

Primary Examiner — Melvin C. Mayes
Assistant Examiner — Stefanie J Cohen
(74) Attorney, Agent, or Firm — JCIPRNET

(57) ABSTRACT

A porous catalyst for catalytic activating persulfates to decompose typical pollutants in papermaking wastewater is provided, and a synthesis method thereof and a method of degrading the typical pollutants in paper wastewater by using the porous catalyst are also provided. The porous catalyst MIL-88A@MIP is prepared by a molecular imprinting method comprising using metal organic framework MIL-88A as a precursor and using phthalates as templates.

15 Claims, 2 Drawing Sheets

(51) Int. Cl.
*C02F 1/72* (2006.01)
*C02F 103/28* (2006.01)

(52) U.S. Cl.
CPC ...... *B01J 2531/842* (2013.01); *B01J 2531/96* (2013.01); *C02F 2103/28* (2013.01)

(56) References Cited

FOREIGN PATENT DOCUMENTS

| CN | 107029790 | 8/2017 |
|---|---|---|
| WO | 2012173400 | 12/2012 |

OTHER PUBLICATIONS

Lin et al, Iron-based metal organic framework, MIL-88A, as a heterogeneous persulfate catalyst for decolorization of Rhodamine B in water, RSC Adv., 5, 32520-32530 (Year: 2015).*

Lin et al., "Iron-based metal organic framework, MIL-88A, as a heterogeneous persulfate catalyst for decolorization of Rhodamine B in water," RSC Advances, Mar. 25, 2015, pp. 32520-32530.

Wang et al., "Metal-organic frameworks MIL-88A with suitable synthesis conditions and optimal dosage for effective catalytic degradation of Orange G through persulfate activation," RSC Advances, Nov. 15, 2016, pp. 112502-112511.

Cao et al., "Microwave-assisted synthesis of Ag/Ag2SO4/ZnO nanostructures for efficient visible-light-driven photocatalysis," Journal of Molecular Catalysis A: Chemical, Mar. 3, 2015, pp. 81-89.

He et al., "Syntheses of two coordination polymers with rutile-type topology and the single-crystal-tosingle-crystal transformation of Mg(II) complex induced by methanol," CrystEngComm, Apr. 7, 2014, pp. 4210-4214.

Lin et al., "Zeolitic Imidazole Framework-67(ZIF-67)as a heterogeneous catalyst to activate peroxymonosulfate for degradation of Rhodamine B in water," Journal of the Taiwan Institute of Chemical Engineers, Mar. 4, 2015, pp. 40-45.

Li et al., "Degradation of refractory dibutyl phthalate by peroxymonosulfate activated with novel catalysts cobalt metal-organic frameworks: Mechanism, performance, and stability," Journal of Hazardous Materials, Jun. 29, 2016, pp. 154-163.

"International Search Report (Form PCT/ISA/210)", dated Feb. 26, 2018, pp. 1-5.

"Written Opinion of the International Searching Authority (Form PCT/ISA/237)" of PCT/CN2017/112448, dated Feb. 26, 2016, with English translation thereof, pp. 1-8.

* cited by examiner

CATALYTIC MATERIAL FOR CATALYTIC ACTIVATION OF PERSULFATE AND TARGETED DEGRADATION OF TYPICAL POLLUTANT IN PAPERMAKING WASTEWATER AND SYNTHESIS METHOD AND USE THEREOF

CROSS-REFERENCE TO RELATED APPLICATION

This application is a 371 of international application of PCT application serial no. PCT/CN2017/112448, filed on Nov. 23, 2017, which claims the priority benefit of China application no. 201710236647.8, filed on Apr. 12, 2017. The entirety of each of the above-mentioned patent applications is hereby incorporated by reference herein and made a part of this specification.

TECHNICAL FIELD

The present invention belongs to a technical field of oxidation treatment of an organic pollutant in water, and in particular, to a catalytic material for catalytic activation of a persulfate and targeted degradation of a typical pollutant in a papermaking wastewater as well as a synthesis method and use thereof.

BACKGROUND

Nowadays, controlling water pollution is a subject of research by environmental protection personnel, and water pollution is one of the serious crises that facing human today. Controlling water pollution, especially controlling toxic and harmful organic pollution in water, is a key point and a difficult point in water treatment engineering research. In recent years, use of advanced oxidation technologies (AOTs) activating a persulfate (PS) to generate sulfate radical anion in treatment of refractory organic wastewater is a research hotspot in the technical field of wastewater treatment.

Compared with the traditional Fenton method, the PS oxidation technology produces $SO_4^{31}$ without requiring an acidic condition of pH 3-5to achieve an effective degradation of pollutants, and SO4$^-$ has a standard oxidation-reduction potential ($E^0$=+2.5 to +3.1 v) higher than a hydroxyl radical (OH.) ($E^0$=+1.9 to +2.7 v) generated by the Fenton method, a higher stability, a longer half-life period (about 4 s), and a lower reactivity with background organics naturally occurring in the wastewater. Thus, the PS oxidation technology has a higher efficiency in oxidative degradation of pollutants. In existing reports, photoactivation, thermal activation, ultrasound and metal ion activation are generally used for formation of sulfate radical anion from the persulfate. However, these technologies have disadvantages of high cost, sludge generation and the like, which make them difficult to be widely used in real life. Use of a metal organic framework as a heterogeneous catalyst to catalyze the persulfate or a hydrogen persulfate to produce sulfate ions overcomes these disadvantages, has advantages such as reusability, high activity, and good catalytic effect, and has become a research hotspot for researchers today.

Metal organic frameworks (MOFs) are a kind of crystalline porous materials with a regular pore or hole structure obtained by coordination self-assembly of metal nodes and organic ligands. This material has a relatively high specific surface area, a rich pore structure and a relatively high physical and chemical stability, and is easy to load other substances without changing its own structure, and the metal organic framework contains a large number of unsaturated coordination metal nodes, making it shows excellent performance in aspects such as catalysis, separation, and adsorption. At present, researches of MOFs in the field of AOTs have made preliminary progress. For example, MIL-88A was successfully applied to activate PS for oxidation degradation of rhodamine B dye and gold orange G dye (RSC Advances. 2015, 5: 32520-32530; RSC Advances. 2016, 6:112502-112511); MIL-100 (Fe) and [$Cu_2$(btec)(btx) 1.5]$_n$, were proved to be effective catalysts for a Fenton-like reaction, and were capable of activating $H_2O_2$ degradation to produce OH. (Journal of Molecular Catalysis A: Chemical. 2015, 400: 81-89; Cryst. Eng. Comm. 2012, 14: 4210-4216); and a research found that ZIF-67 and $Co_3(BTC)_2$.12 $H_2O$ are both high-efficient heterogeneous catalysts for catalytic activation of peroxymonosulfate (PMS) (Journal of the Taiwan Institute of Chemical Engineers. 2015, 53: 40-45; Journal of Hazardous Materials. 2016, 318:154-163).

In the present invention, a catalytic material MIL-88A@MIP which is synthesized using a metal organic framework as a precursor and has a selectivity for degradation of a papermaking wastewater combines the advantages of the metal organic framework, and the material is further modified using a molecular imprinting method. That is, MIL-88A@MIP means that MIL-88A is coated with a molecular imprinted polymer (MIP) on the surface thereof. The catalytic material thus enables a high-efficient catalytic activation of the persulfate to produce sulfate radical anion that selectively adsorbs and degrades organic pollutants, especially phthalates, in the papermaking wastewater. The catalyst has a good recycling effect, an operation cost is reduced, and its pH application range is wide, providing a wide range of application prospects for the treatment of the papermaking wastewater.

SUMMARY OF THE INVENTION

An object of the present invention aims at existing homogeneous catalysts, such as ferrous ions and zero-valent iron, have a problem of the ferrous ions being prone to failure, cannot be recycled and producing iron sludge in an activating persulfate system, to provide a heterogeneous catalyst that is capable of catalytic activation of PS to selectively adsorb and degrade refractory pollutants in a papermaking wastewater. This catalyst has advantages of less dosage, simple equipment, convenient operation, low cost and wide suitable pH range.

The object of the present invention is realized by following technical solution.

A synthesis method of a catalytic material for catalytic activation of a persulfate and targeted degradation of a typical pollutant in a papermaking wastewater, comprising following steps:

(1) dissolving phthalates pollutants in acetonitrile, adding a metal organic framework MIL-88A and methacrylic acid successively, stirring well with an intermediate speed, adding tetraethyl orthosilicate and acetic acid, sealed and then heated in a water bath at 60° C. to 80° C., centrifuging, and drying an obtained solid; and (2) performing Soxhlet extraction to the dried solid to extract phthalates as template molecules, drying the obtained solid to obtain the catalytic material, and marking the catalytic material as MIL-88A@MIP.

Further, the metal organic framework is MIL-88A, and MIL-88A has a hexagonal rod shape with a specific surface area of 10-30 m$^2$/g. The catalyzed material is MIL- 88A@MIP with a selective adsorption and degradation of pollutants, prepared by using MIL-88A as a precursor.

Further, a preparation method of the metal organic framework MIL-88A mentioned in the step (1) comprises following steps:

(1a) dissolving fumaric acid and $FeCl_3 \cdot 6H_2O$ with a molar ratio of 1:10 to 20:1 in deionized water, stirring for 1 to 2 hours, transferring the solution that is stirred well to a polytetrafluoroethylene-lined reaction kettle, placing the reaction kettle in an air dry oven for reacting at 65-105° C. for 2-12 hours, taking out the reaction kettle, and cooling down the reaction kettle to room temperature; and (1b) after the reaction kettle is cooled down, transferring the reaction mixture in the reaction kettle into a centrifuge tube for centrifuging for 10-12 minutes under a condition of 8000-10000 rpm to obtain a light yellow solid; pouring the light yellow solid into a beaker, repeatedly washing the light yellow solid with ethanol and water for several times, centrifuging to separate and obtain a wet metal organic framework MIL-88A solid; and placing the wet metal organic framework MIL-88A solid into a vacuum drying oven, drying at 80-120° C. for 8-12 hours to obtain the metal organic framework MIL-88A.

Further, the phthalates pollutants mentioned in the step (1) is one or more of DBP (dibutyl phthalate), DMP (dimethyl phthalate), DEP (diethyl phthalate), etc.

Further, an amount used of the phthalates pollutants mentioned in the step (1) is 0.150 mL to 0.369 mL, an amount used of acetonitrile is 10.0 mL to 20.0 mL, an amount used of the metal organic framework MIL-88A is 0.05 g to 0.2 g, an amount used of methacrylic acid is 0.7 mL to 1.7 mL, an amount used of tetraethyl orthosilicate is 12.75 mL to 22.75 mL, an amount used of acetic acid is 0.50 mL to 0.85 mL, and a molar ratio of the phthalates pollutants : methacrylic acid : tetraethyl orthosilicate is maintained at 1:40:200, while the remaining parameters can be kept within the ranges.

Further, the stirring mentioned in the step (1) is performed for 0.5 hour to 3 hours; and the heating time in the water bath is 10 hours to 20 hours.

Further, the drying mentioned in the step (1b) is drying in a vacuum drying oven at 60° C. to 80° C. for 8 hours to 12 hours.

Further, the Soxhlet extraction mentioned in the step (2) is performed for 6 to 12 times, an amount used of an extraction agent for each time is 100 mL to 250 mL; and the extraction agent for the Soxhlet extraction is ethanol/acetic acid, with a volume ratio of 1:9 to 9:1.

A catalytic material for catalytic activation of a persulfate and targeted degradation of a typical pollutant in a papermaking wastewater is synthesized by the above-described method.

A use of the above-described catalytic material in catalytic activation of a persulfate and targeted degradation of a typical pollutant in a papermaking wastewater comprises following steps: adding a catalytic material MIL-88A@MIP and the persulfate into the papermaking wastewater with pH 2-7, and reacting in a shaker with a rotation rate of 50-500 rpm at room temperature for 120-600 minutes.

Further, the persulfate is one or more of sodium persulfate, potassium persulfate and ammonium persulfate; and phthalates pollutants in the papermaking wastewater are one or more of DMP, DBP, DEP, DPP, etc.

Further, a molar ratio of the persulfate and the phthalates pollutants in the papermaking wastewater is 100:1 to 800:1, further preferably 200:1 to 800:1. an amount used of the catalytic material MIL-88A@MIP is 0.3 g/L to 2 g/L.

Further, the catalytic material MIL-88A@MIP has been recycled for many times, embodying a maximum catalytic capacity of the catalyst.

In the present invention, the catalytic material MIL-88A@MIP is synthesized as a heterogeneous catalyst by using the metal organic framework MIL-88A as the precursor, pores on the surface of the catalytic material are used to selectively adsorb the pollutants, and then an unsaturated coordination center of an active site of the metal organic framework is used. The catalytic material MIL-88A@MIP and the persulfate are put into organic wastewater together at room temperature, the catalytic material generates sulfide radical anion through catalytic activation of the persulfate, thereby the sulfide radical anion oxidizes and degrades the refractory pollutants in the papermaking wastewater, and a water quality environment is improved. The catalytic material is MIL-88A@MIP, a catalyst with a selective degradation of pollutants, prepared by a molecular imprinting method using MIL-88A as the precursor.

Compared with the prior art, the present invention has following advantages:

(1) the present invention provides the preparation method of the catalytic material MIL-88A@MIP, which has a simple operation, mild preparation conditions, and a relatively strong repeatability, and is easy to implement;

(2) the catalytic material of the present invention has relatively more pore structures and unsaturated metal active centers, which enhances an effect of the persulfate on generation of sulfate radical anion, and the catalyst has a good removal effect on pollutants;

(3) the heterogeneous catalyst of the present invention is capable of selective and high-efficient adsorption and degradation of the refractory pollutants in the papermaking wastewater, which is targeted to target pollutants;

(4) the catalyst of the present invention can be repeatedly recycled, is environmentally friendly, and has no secondary pollution;

(5) the catalyst of the present invention has wide suitable pH range; and (6) the method of the present invention does not need to consume extra energy, such as ultrasound, light, electricity, etc., which reduces the cost; and a process flow is very simple, an operability is strong, a durability is good, a catalytic time is short, and it has a broad practical application prospect.

DETAILED DESCRIPTION OF THE PREFERED EMBODIMENT

Figure 1:
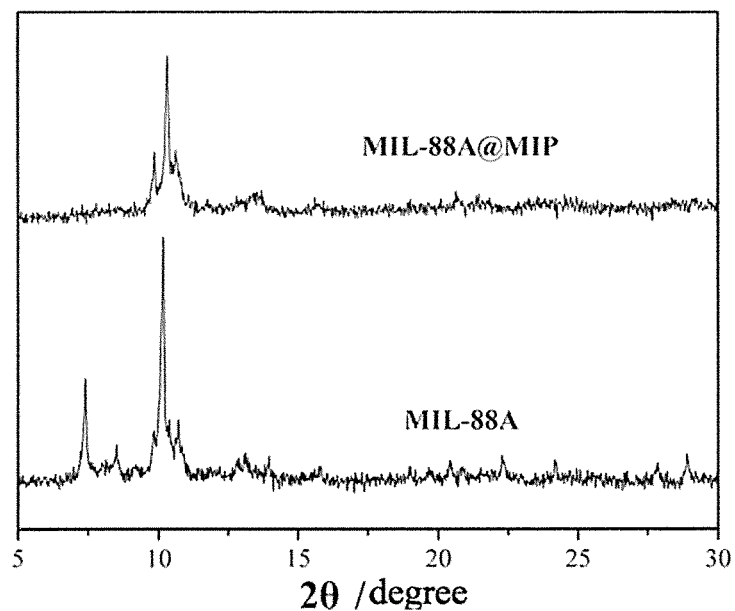
FIG. 1 is an X-ray crystal diffraction (XRD) diagram of MIL-88A@MIP and MIL-88A.

The present invention mainly uses phthalates (such as DBP) in organic wastewater from the paper industry as a typical pollutant. The specific implementation of the present invention will be further described below by embodiments and accompanying drawings, but the implementation of the present invention is not limited thereto.

Embodiment 1:

In the present embodiment, a catalytic material MIL-88A@MIP synthesized by a molecular imprinting method using a metal organic framework MIL-88A as a precursor. The MIL-88A@MIP was used as a catalyst to study the effect of the catalytic material on adsorption and degradation of DBP.

(1) Preparation of the metal organic framework MIL-88A: 0.9744 g (1 mol) of fumaric acid and 2.2722 g (1 mol) of $FeCl_3 \cdot 6H_2O$ weighed and dissolved in 42 mL of deionized water, after 1 hour of stirring, a mixture was transferred to a 100 mL polytetrafluoroethylene-lined reaction kettle, the reaction kettle was placed in an air dry oven, after 2 hours of reaction at 65° C., the reaction kettle was taken out and was placed at room temperature for cooling down; after the reaction kettle was cooled down, the mixture was taken out for centrifuging for 10 minutes under a condition of 9000 rpm to separate and obtain a light yellow solid, the light yellow solid was then poured into a beaker, washed for 3 hours with ethanol, centrifuged, and then washed for 3 hours with deionized water, repeated for twice, an obtained solid was put into a vacuum drying oven for drying at 100° C. for 8 hours; and the metal organic framework MIL-88A was obtained and kept for later use;

(2) preparation of the catalytic material MIL-88A@MIP: 0.267 mL of DBP and 20.0 mL of acetonitrile were measured and mixed in a bottle to obtain a solution, 0.1 g of MIL-88A was added into the solution, then 1.7 mL of methacrylic acid was added, after 1 hour of stirring on a magnetic stirring apparatus at 500 rpm, 22.75 mL of tetraethyl orthosilicate and 0.85 mL of acetic acid were added, after sealing the bottle, the bottle was heated in a water bath at a temperature of 60° C. for 20 hours, after centrifuging, a solid was obtained and dried, the dried solid was put into a Soxhlet extractor to extract an exemplary molecule DBP using an extraction agent of ethanol/acetic acid =9:1 (volume ratio), 150mL of the exemplary molecule was extracted each time and the extraction was performed for 6 times, the solid was put into the vacuum drying oven (60° C.) and dried for 12 hours; and the catalytic material MIL-88A@MIP was obtained;

(3) 360 mmol/L $Na_2S_2O_8$ solution and 0.018 mmol/L DBP solution were prepared for later use;

(4) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.05 g of the catalytic material MIL-88A@MIP was added into the reactor, the conical flask was placed in a shaker with 200 rpm, the reaction was conducted at room temperature, pH was adjusted to 3.26, and sampling analysis was performed at a fixed point;

(5) the catalytic material MIL-88A@MIP was not added into the reactor, and other conditions were the same as the step (4); and (6) the $Na_2S_2O_8$ solution was not added into the reactor, and other conditions were the same as the step (4).

Removal rates of the above three processes are shown in Table 1:

TABLE 1

| | Removal rate (%) | | |
|---|---|---|---|
| Time (min) | Process (4) | Process (5) | Process (6) |
| 0 | 0.0 | 0.0 | 0.0 |
| 30 | 20.3 | 27.9 | 2.7 |
| 60 | 39.7 | 34.9 | 5.3 |
| 120 | 62.0 | 37.7 | 7.4 |
| 180 | 65.8 | 36.1 | 7.7 |
| 240 | 66.1 | 34.3 | 6.0 |

TABLE 1-continued

| | Removal rate (%) | | |
|---|---|---|---|
| Time (min) | Process (4) | Process (5) | Process (6) |
| 300 | 68.9 | 31.3 | 3.3 |
| 360 | 74.7 | 33.9 | 6.0 |
| 480 | 80.4 | 33.5 | 3.4 |

It can be seen from the above table that, using sodium persulfate alone has basically no degradative effect on DBP, but when the catalytic material MIL-88A@MIP is added, a removal rate of DBP increases, indicating that the catalytic material MIL-88A@MIP has certain adsorption properties for phthalates. When the catalytic material MIL-88A@MIP and sodium persulfate are added at the same time, the removal rate significantly increases. After 8 hours of reaction, the removal rate of DBP can reach around 80%.

Embodiment 2:

In the present embodiment, a catalytic material MIL-88A@MIP synthesized by a molecular imprinting method using a metal organic framework MIL-88A as a precursor was used as a catalyst to study an effect of different molar ratio of $Na_2S_2O_8$ and DBP ($nNa_2S_2O_8/nDBP=200, 400, 600, 800$) during reaction on a removal rate of a pollutant.

(1) The preparation method of the metal organic framework MIL-88A was the same as the step (1) in the Embodiment 1;

(2) the preparation method of the catalytic material MIL-88A@MIP was the same as the step (2) in the Embodiment 1;

(3) 360 mmol/L $Na_2S_2O_8$ solution and 0.018 mmol/L DBP solution were prepared for later use;

(4) a conical flask was used as a reactor, 1 mL of 360 mmol/L $Na_2S_2O_8$ solution and 100 mL of 0.018 mmol/L DBP solution ($nNa_2S_2O_8/nDBP=200$) were added into the reactor, and meanwhile 0.05 g of the catalytic material MIL-88A@MIP was added into the reactor, the conical flask was placed in a shaker with 300 rpm, a reaction was conducted at room temperature, pH was adjusted to 3.26, and sampling analysis was perfoiiiied at a fixed point;

(5) 2 mL of 360 mmol/L $Na_2S_2O_8$ solution and 100 mL of 0.018 mmol/L DBP solution ($nNa_2S_2O_8/nDBP=400$) were added into the reactor, and others were the same as the step (4);

(6) 3 mL of 360 mmol/L $Na_2S_2O_8$ solution and 100 mL of 0.018 mmol/L DBP solution ($nNa_2S_2O_8/nDBP=600$) were added into the reactor, and others were the same as the step (4); and (7) 4 mL of 360 mmol/L $Na_2S_2O_8$ solution and 100 mL of 0.018 mmol/L DBP solution ($nNa_2S_2O_8/nDBP=800$) were added into the reactor, and others were the same as the step (4).

Removal rates of the above four processes are shown in Table 2:

TABLE 2

| | Removal rate/% | | | |
|---|---|---|---|---|
| Time/min | Process (4) | Process (5) | Process (6) | Process (7) |
| 0 | 0.0 | 0.0 | 0.0 | 0.0 |
| 30 | 10.8 | 15.6 | 20.3 | 23.1 |
| 60 | 28.6 | 29.8 | 39.7 | 40.1 |
| 120 | 36.3 | 43.2 | 62.0 | 63.8 |
| 180 | 39.4 | 47.8 | 65.8 | 64.9 |
| 240 | 42.3 | 56.2 | 66.1 | 65.7 |

TABLE 2-continued

| | Removal rate/% | | | |
|---|---|---|---|---|
| Time/min | Process (4) | Process (5) | Process (6) | Process (7) |
| 300 | 49.6 | 60.0 | 68.9 | 69.7 |
| 360 | 53.1 | 68.3 | 74.7 | 76.4 |
| 480 | 60.2 | 72.4 | 80.4 | 81.3 |

It can be seen from the above table that, as the ratio of $nNa_2S_2O_8/nDBP$ increases, the removal rate of the pollutant DBP in a papermaking wastewater shows an upward trend. When the ratio is from 200:1 to 600:1, the removal rate increases rapidly, while the ratio is from 600:1 to 800:1, the removal rate does not change substantially, showing a weak trend.

Embodiment 3:

In the present embodiment, a catalytic material MIL-88A@MIP synthesized by a molecular imprinting method using a metal organic framework MIL-88A as a precursor was used as a catalyst to study an effect of an amount used of the catalytic material MIL-88A@MIP (0.03 g, 0.05 g, 0.1 g, 0.2 g) during reaction on a removal rate of a pollutant.

(1) The preparation method of the metal organic framework MIL-88A was the same as the step (1) in the Embodiment 1;

(2) the preparation method of the catalytic material MIL-88A@MIP was the same as the step (2) in the Embodiment 1;

(3) 360 mmol/L $Na_2S_2O_8$ solution and 0.018 mmol/L DBP solution were prepared for later use;

(4) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.03 g of the catalytic material MIL-88A@MIP was added into the reactor, the conical flask was placed in a shaker with 300 rpm, a reaction was conducted at room temperature, pH was adjusted to 3.26, and sampling analysis was performed at a fixed point;

(5) 0.05 g of the catalytic material MIL-88A@MIP was added into the reactor, and others were the same as the step (4);

(6) 0.1 g of the catalytic material MIL-88A@MIP was added into the reactor, and others were the same as the step (4); and (7) 0.2 g of the catalytic material MIL-88A@MIP was added into the reactor, and others were the same as the step (4).

Removal rates of the above four processes are shown in Table 3:

TABLE 3

| | Removal rate/% | | | |
|---|---|---|---|---|
| Time/min | Process (4) | Process (5) | Process (6) | Process (7) |
| 0 | 0.0 | 0.0 | 0.0 | 0.0 |
| 30 | 16.8 | 20.3 | 29.8 | 30.2 |
| 60 | 30.3 | 39.7 | 36.7 | 38.9 |
| 120 | 56.4 | 62.0 | 63.2 | 65.1 |
| 180 | 60.2 | 65.8 | 69.3 | 69.9 |
| 240 | 63.7 | 66.1 | 74.2 | 75.2 |
| 300 | 69.4 | 68.9 | 76.9 | 77.9 |
| 360 | 70.1 | 74.7 | 80.1 | 80.3 |
| 480 | 73.5 | 80.4 | 83.2 | 84.1 |

It can be seen from the above table that, with the increase of the used amount of the catalytic material MIL-88A@MIP, the removal rate of the pollutant DBP increases.

Embodiment 4:

In the present embodiment, a catalytic material MIL-88A@MIP synthesized by a molecular imprinting method using a metal organic framework MIL-88A as a precursor was used as a catalyst to study an effect of a pH value (2.68, 3.26, 4.79, 6.94) in a reaction system on a removal rate of a pollutant DBP.

(1) The preparation method of the metal organic framework MIL-88A was the same as the step (1) in the Embodiment 1;

(2) the preparation method of the catalytic material MIL-88A@MIP was the same as the step (2) in the Embodiment 1;

(3) 360 mmol/L $Na_2S_2O_8$ solution and 0.018 mmol/L DBP solution were prepared for later use;

(4) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.05 g of the catalytic material MIL-88A@MIP was added into the reactor, the conical flask was placed in a shaker with 300 rpm, a reaction was conducted at room temperature, pH was adjusted to 2.68, and sampling analysis was performed at a fixed point;

(5) pH was adjusted to 3.26, and others were the same as the step (4);

(6) pH was adjusted to 4.79, and others were the same as the step (4); and (7) pH was adjusted to 6.94, and others were the same as the step (4).

Removal rates of the above four processes are shown in Table 4:

TABLE 4

| | Removal rate/% | | | |
|---|---|---|---|---|
| Time/min | Process (4) | Process (5) | Process (6) | Process (7) |
| 0 | 0.0 | 0.0 | 0.0 | 0.0 |
| 30 | 10.1 | 20.3 | 8.9 | 5.1 |
| 60 | 15.6 | 39.7 | 10.5 | 7.3 |
| 120 | 38.7 | 62.0 | 12.4 | 8.9 |
| 180 | 40.9 | 65.8 | 13.9 | 9.7 |
| 240 | 45.2 | 66.1 | 15.6 | 12.3 |
| 300 | 59.1 | 68.9 | 17.2 | 15.9 |
| 360 | 65.4 | 74.7 | 18.9 | 17.3 |
| 480 | 68.2 | 80.4 | 25.6 | 19.8 |

It can be seen from the above table that, the pH value in the system has a great influence on the removal rate of DBP. The pH value of over-acid or neutrality is not ideal for a degradation effect of pollutants, but the removal rate of DBP is highest when pH=3.26.

Embodiment 5:

In the present embodiment, a catalytic material synthesized by a molecular imprinting method using a metal organic framework MIL-88A as a precursor was used as a catalyst to study an effect of the precursor MIL-88A, a catalytic material MIL-88A@NIP synthesized with no template molecule added and a catalytic material MIL-88A@MIP synthesized with a template molecule added on a removal rate of a pollutant DBP.

(1) The preparation method of the metal organic framework MIL-88A was the same as the step (1) in the Embodiment 1;

(2) the preparation method of the catalytic material MIL-88A@MIP was the same as the step (2) in the Embodiment 1;

(3) a preparation method of the catalytic material MIL-88A@NIP was as follows: 0.1 g of MIL-88A was added into 20.0 mL of acetonitrile in a bottle, 1.7 mL of methacrylic acid was then added, after being stirred on a magnetic stirring apparatus at 500 rpm for 1 hour, 22.75 mL of tetraethyl orthosilicate and 0.85 mL of acetic acid were added, after sealing the bottle, it was heated in a water bath at a temperature of 60° C. for 20hours, after centrifuging, a solid was obtained and then dried, the dried solid was put into a Soxhlet extractor to be extracted using an extraction agent of ethanol/acetic acid =9:1 (volume ratio), 150 mL extraction agent was used each time and the extraction was performed for 6 times, the solid was put into the vacuum drying oven (60° C.) and dried for 12 hours; and the catalytic material MIL-88A@NIP was obtained;

(4) 360 mmol/L $Na_2S_2O_8$ solution and 0.018 mmol/L DBP solution were prepared for later use;

(5) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.05 g of the catalytic material MIL-88A@MIP was added into the reactor, the conical flask was placed in a shaker with 300 rpm, a reaction was conducted at room temperature, pH was adjusted to 3.26, and sampling analysis was performed at a fixed point;

(6) 0.05 g of the precursor material MIL-88A was added into the reactor, and others were the same as the step (5); and (7) 0.05 g of MIL-88A@NIP synthesized with no template molecule was added into the reactor, and others were the same as the step (5).

Removal rates of the above three processes are shown in Table 5:

TABLE 5

| | Removal rate/% | | |
|---|---|---|---|
| Time/min | Process (4) | Process (5) | Process (6) |
| 0 | 0.0 | 0.0 | 0.0 |
| 60 | 39.7 | 13.2 | 3.1 |
| 180 | 65.8 | 16.7 | 5.9 |
| 300 | 68.9 | 21.6 | 12.5 |
| 480 | 80.4 | 39.4 | 17.0 |

It can be seen from the above table that, the precursor, the metal organic framework MIL-88A, has a certain effect on the removal of DBP. However, compared to the catalytic material MIL-88A@MIP, its effect is relatively weak, and the removal effect of MIL-88A@NIP on DBP is basically small, indicating that the catalytic material MIL-88A@MIP can effectively increase the removal rate of DBP.

Embodiment 6:

In the present embodiment, a catalytic material MIL-88A@MIP synthesized by a molecular imprinting method using a metal organic framework MIL-88A as a precursor was used as a catalyst to study an effect of the catalyst on a removal rate of different phthalates (DBP, DEP, DMP) in a papermaking wastewater.

(1) The preparation method of the metal organic framework MIL-88A was the same as the step (1) in the Embodiment 1;

(2) The preparation method of the catalytic material MIL-88A@MIP was the same as the step (2) in the Embodiment 1;

(3) 360 mmol/L $Na_2S_2O_8$ solution, 0.018 mmol/L DBP solution, 0.018 mmol/L DEP solution, and 0.018 mmol/L DMP solution were prepared;

(4) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.05 g of the catalytic material MIL-88A@MIP was added into the reactor, the conical flask was placed in a shaker with 300 rpm, a reaction was conducted at room temperature, pH was adjusted to 3.26, and sampling analysis was performed at a fixed point;

(5) 3 mL of 360 mmol/L $Na_2S_2O_8$ solution and 100 mL of 0.018 mmol/L DEP solution ($nNa_2S_2O_8/nDEP=600$) were added into the reactor, and others were the same as the step (4); and (6) 3 mL of 360 mmol/L $Na_2S_2O_8$ solution and 100 mL of 0.018 mmol/L DMP solution ($nNa_2S_2O_8/nDMP=600$) were added into the reactor, and others were the same as the step (4).

Removal rates of the above three processes are shown in Table 6:

TABLE 6

| | Removal rate/% | | |
|---|---|---|---|
| Time/min | Process (4) | Process (5) | Process (6) |
| 0 | 0.0 | 0.0 | 0.0 |
| 30 | 20.3 | 23.2 | 19.7 |
| 60 | 39.7 | 40.7 | 36.2 |
| 120 | 62.0 | 65.7 | 59.5 |
| 240 | 66.1 | 69.2 | 65.9 |
| 360 | 74.7 | 77.2 | 70.1 |
| 480 | 80.4 | 84.5 | 77.4 |

It can be seen from the above table that, MIL-88A@MIP has a relatively high removal rate for the phthalates in the papermaking wastewater, and the removal rates DEP>DBP>DMP, which illustrates that catalytic material MIL-88A@MIP has high feasibility and effectiveness in degradation of refractory pollutants in the papermaking wastewater.

Embodiment 7:

In the present embodiment, a catalytic material MIL-88A@MIP synthesized by a molecular imprinting method using a metal organic framework MIL-88A as a precursor was used as a catalyst to study an effect of recycling the catalyst on a removal rate of DBP.

(1) The preparation method of the metal organic framework MIL-88A was the same as the step (1) in the Embodiment 1;

(2) The preparation method of the catalytic material MIL-88A@MIP was the same as the step (2) in the Embodiment 1;

(3) 360 mmol/L $Na_2S_2O_8$ solution and 0.018 mmol/L DBP solution were prepared for later use;

(4) a conical flask was used as a reactor, 3 mL of 360 mmol/L $Na_2S_2O_8$ solution and 100 mL of 0.018 mmol/L DBP solution ($nNa_2S_2O_8/nDBP=600$) were added into the reactor, and meanwhile 0.05 g of the catalytic material MIL-88A@MIP was added into the reactor, the conical flask was placed in a shaker with 300 rpm, a reaction was conducted at room temperature, pH was adjusted to 3.26, and sampling analysis was performed at a fixed point;

(5) after the step (4) was completed, the catalyst in the conical flask was centrifuged and separated, dried in an oven at 65° C., and put into the same reactor as a system of the step (4), and other conditions are the same as in the step (3); and (6) The catalyst was recycled in accordance with the step (4) and the step (5) for four times, and results of the removal rate of DBP in each cycle are shown in Table 7:

TABLE 7

| Time (min) | Removal rate (%) | | | |
|---|---|---|---|---|
| | 1st | 2nd | 3rd | 4th |
| 0 | 0.0 | 0.0 | 0.0 | 0.0 |
| 30 | 20.3 | 36.3 | 26.4 | 19.2 |
| 60 | 39.7 | 49.6 | 43.2 | 35.3 |
| 120 | 62.0 | 70.1 | 65.1 | 58.3 |
| 240 | 66.1 | 75.4 | 68.2 | 59.1 |
| 360 | 74.7 | 79.3 | 75.3 | 70.2 |
| 480 | 80.4 | 84.1 | 80.0 | 73.7 |

It can be seen from the above table that: after four cycles, and in the case where the catalyst loses, the removal rate of the targeting material MIL-88A@MIP for degradation of DBP still remains at 70% or more, indicating that MIL-88A@MIP has good recyclability.

Characterization of Catalyst:

FIG. 1 is an X-ray crystal di fiaction (XRD) diagram of MIL-88A@MIP. Compared with the XRD diagram of the precursor MIL-88A, it can be seen that a peak of the catalytic material around 2θ=7.2° changed, while a peak position of a main peak around 2θ=10.3° did not change but the peak intensity weakened. Through these changes, it can be inferred that some changes have occurred in a crystalline form of the metal organic framework during a synthesis of the catalytic material, and it can be considered that the catalytic material synthesized by the molecular imprinting method is a material different from the metal organic framework itself, but a modified material based on the metal organic framework.

Figure 2:
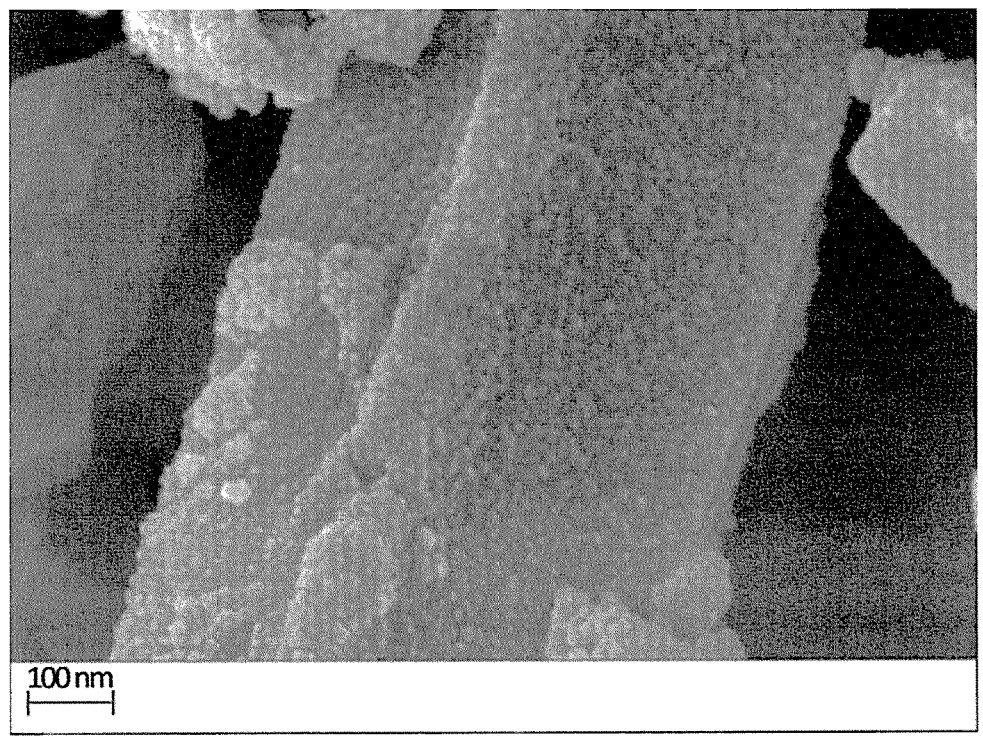
FIG. 2 is a scanning electron microscope (SEM) image of MIL-88A@MIP.
Figure 3:
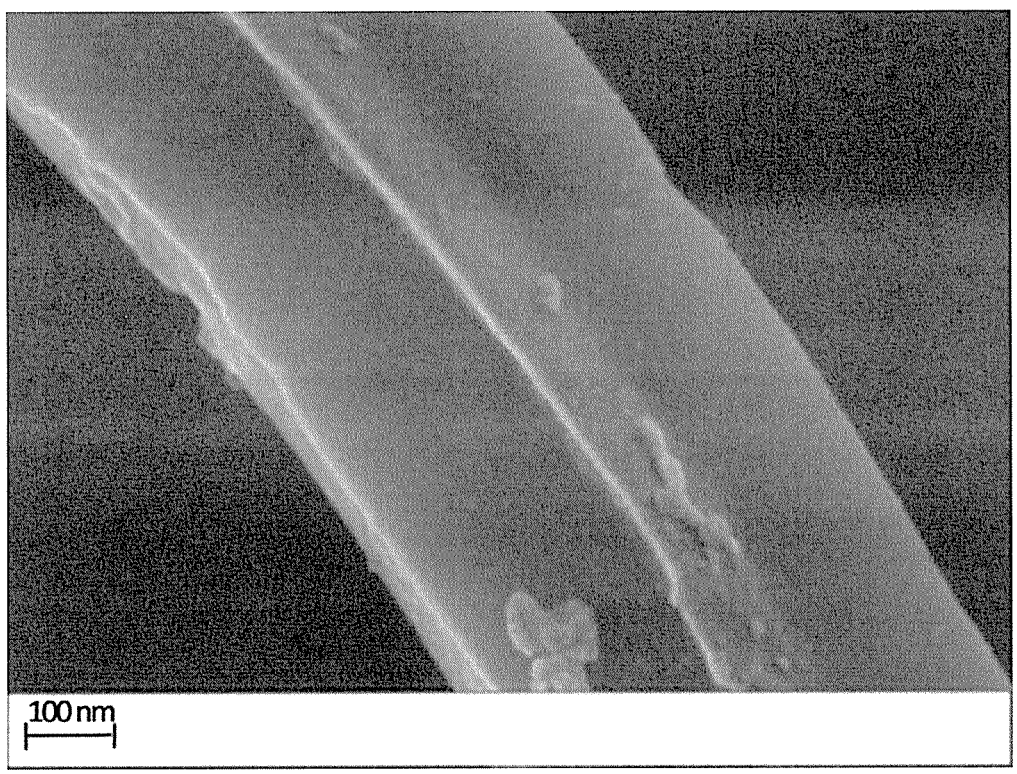
FIG. 3 is a scanning electron microscope (SEM) image of MIL-88A.

FIG. 2 and FIG. 3 are a scanning electron microscope (SEM) image of MIL-88A@MIP and a scanning electron microscope (SEM) image of MIL-88A, respectively. Through comparing surfaces of the two images, it can be seen that the surface of FIG. 2 has a greater change than the surface of FIG. 3, and it can be seen that the catalytic material forms many small cavities on its surface for adsorption of pollutant molecules in the process of removing pollutants and then activation and degradation of pollutants using active metal sites of the metal organic framework. In combination with its XRD diagram, it can be considered that the catalytic material MIL-88A@MIP has synthesized successfully.

The above-described embodiments are preferred implementations of the present invention, but the implementations of the present invention are not limited by the above-described embodiments, any other changes, modifications, replacements, combinations, and simplifications made without departing from the spirit and principles of the present invention shall be equivalent displacements, and shall all be included in the scope of protection of the present invention.

What is claimed is:

1. A method of preparing a catalyst for degrading phthalates in water, the method comprising:
   dissolving phthalates in acetonitrile in a reactor;
   sequentially adding metal organic framework MIL-88A and methacrylic acid into the reactor and stirring for a first period of time;
   adding tetraethyl orthosilicate and acetic acid into the reactor;
   sealing the reactor;
   heating the reactor at 60-80° C. for a second period of time to form a catalyst containing the phthalates by using the phthalates as template molecules;
   removing the phthalates from the obtained catalyst by extracting to obtain a porous catalyst MIL-88A@MIP; and
   drying the porous catalyst MIL-88A@MIP.

2. The method of claim 1, wherein the metal organic framework MIL-88A is prepared by reacting fumaric acid and $FeCl_3.6H_2O$ in water, and a molar ratio of the fumaric acid and the $FeCl_3.6H_2O$ is 1:10 to 20:1.

3. The method of claim 1, wherein the phthalates comprise at least one of dimethyl phthalate, diethyl phthalate, and dibutyl phthalate.

4. The method of claim 1, wherein a molar ratio of the phthalates, the methacrylic acid and the tetraethyl orthosilicate is about 1:40:200.

5. The method of claim 1, wherein the first period of time is about 0.5-3 hours.

6. The method of claim 1, wherein the second period of time is about 10-20 hours.

7. A catalyst for degrading phthalates in water, comprising a porous catalyst MIL-88A@MIP, wherein the porous catalyst MIL-88A@MIP is prepared by the method of claim 1.

8. The catalyst of claim 7, wherein the phthalates comprise at least one of dimethyl phthalate, diethyl phthalate, and dibutyl phthalate.

9. The catalyst of claim 7, wherein a molar ratio of the phthalates, the methacrylic acid and the tetraethyl orthosilicate is about 1:40:200.

10. A method degrading phthalates in water, the method comprising:
    adding a persulfate and the porous catalyst MIL-88A@MIP of claim 7 into an aqueous solution containing phthalates.

11. The method of claim 10, wherein the persulfate comprises at least one of sodium persulfate, potassium persulfate and ammonium persulfate.

12. The method of claim 10, wherein the phthalates comprise at least one of dimethyl phthalate, diethyl phthalate, and dibutyl phthalate.

13. The method of claim 10, wherein an acidity of the solution is pH 2-7.

14. The method of claim 10, wherein a molar ratio of the persulfate and the phthalates is about 100:1 to 800:1.

15. The method of claim 14, wherein the added amount of the porous catalyst MIL-88A@MIP is about 0.3-2 g/L.

* * * * *